(12) United States Patent
Suryanarayana et al.

(10) Patent No.: US 10,331,520 B2
(45) Date of Patent: Jun. 25, 2019

(54) RAID HOT SPARE DISK DRIVE USING INTER-STORAGE CONTROLLER COMMUNICATION

(71) Applicant: Dell Products L.P., Round Rock, TX (US)

(72) Inventors: Shekar Babu Suryanarayana, Bangalore (IN); Lucky Pratap Khemani, Bangalore (IN); Neeraj Joshi, Puducherry (IN); Chitrak Gupta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 15/073,900

(22) Filed: Mar. 18, 2016

(65) Prior Publication Data
US 2017/0270001 A1 Sep. 21, 2017

(51) Int. Cl.
*G06F 11/00* (2006.01)
*G06F 11/10* (2006.01)
*G06F 11/20* (2006.01)

(52) U.S. Cl.
CPC ...... *G06F 11/1092* (2013.01); *G06F 11/2041* (2013.01)

(58) Field of Classification Search
CPC .............. G06F 11/1092; G06F 11/2041
See application file for complete search history.

(56) References Cited

U.S. PATENT DOCUMENTS

| 7,024,585 | B2 | | 4/2006 | Chatterjee et al. | |
|---|---|---|---|---|---|
| 7,644,304 | B2 | * | 1/2010 | Kotzur | G06F 11/1092 711/114 |
| 7,664,913 | B2 | * | 2/2010 | Cassell | G06F 3/0605 711/114 |
| 8,935,567 | B1 | * | 1/2015 | Martin | G06F 11/1092 714/42 |
| 2009/0228674 | A1 | * | 9/2009 | Ouchi | G06F 3/0616 711/168 |
| 2009/0265510 | A1 | * | 10/2009 | Walther | G06F 11/1092 711/114 |
| 2014/0006676 | A1 | * | 1/2014 | Chandrasekhar ... | G06F 13/4022 710/316 |
| 2014/0351548 | A1 | * | 11/2014 | Schnapp | G06F 3/0605 711/170 |

* cited by examiner

*Primary Examiner* — Elmira Mehrmanesh
(74) *Attorney, Agent, or Firm* — Jackson Walker L.L.P.

(57) ABSTRACT

In accordance with embodiments of the present disclosure, a system may include a first storage controller for managing a Redundant Array of Independent Disks (RAID) comprising a plurality of disk drives and a second storage controller for managing at least one disk drive other than the plurality of disk drives. The first storage controller may be configured to: (i) in response to the RAID having a degraded state and the first storage controller not having an available hot spare disk drive local to the first storage controller, communicate a request for a hot spare disk drive of another storage controller; (ii) receive a response to the request identifying a disk drive of the second storage controller as an alternative available hot spare disk drive; and (iii) communicate with the second storage controller to use the alternative available hot spare disk drive to rebuild the RAID.

14 Claims, 4 Drawing Sheets

RAID HOT SPARE DISK DRIVE USING INTER-STORAGE CONTROLLER COMMUNICATION

TECHNICAL FIELD

The present disclosure relates in general to information handling systems, and more particularly to systems and methods for enabling a storage controller to access a disk drive controller by another storage controller as a spare drive.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include storage controllers for managing a plurality of hard disk drives in a Redundant Array of Inexpensive Disks (RAID), in order to provide data redundancy. Typically, a storage controller may maintain a hot spare disk drive in order to rebuild the RAID in the event that the active disk drives in the RAID fail, placing the RAID in a degraded state. However, if a hot spare disk drive is not available to the storage controller, the RAID may continue to operate in a degraded state, leading to risk of data loss.

SUMMARY

In accordance with the teachings of the present disclosure, the disadvantages and problems associated with management of RAIDs may be reduced or eliminated.

In accordance with embodiments of the present disclosure, a system may include a first storage controller for managing a Redundant Array of Independent Disks (RAID) comprising a plurality of disk drives and a second storage controller for managing at least one disk drive other than the plurality of disk drives. The first storage controller may be configured to: (i) in response to the RAID having a degraded state and the first storage controller not having an available hot spare disk drive local to the first storage controller, communicate a request for a hot spare disk drive of another storage controller; (ii) receive a response to the request identifying a disk drive of the second storage controller as an alternative available hot spare disk drive; and (iii) communicate with the second storage controller to use the alternative available hot spare disk drive to rebuild the RAID.

In accordance with these and other embodiments of the present disclosure, a method may include in response to a Redundant Array of Independent Disks (RAID) managed by a first storage controller having a degraded state and the first storage controller not having an available hot spare disk drive local to the first storage controller, communicating a request for a hot spare disk drive of another storage controller. The method may also include receiving a response to the request identifying a disk drive of a second storage controller as an alternative available hot spare disk drive. The method may further include communicating with the second storage controller to use the alternative available hot spare disk drive to rebuild the RAID.

In accordance with these and other embodiments of the present disclosure, an article of manufacture may include a non-transitory computer readable medium and computer-executable instructions carried on the computer readable medium, the instructions readable by a processor. The instructions, when read and executed, may cause the processor to: (i) in response to a Redundant Array of Independent Disks (RAID) managed by a first storage controller having a degraded state and the first storage controller not having an available hot spare disk drive local to the first storage controller, communicate a request for a hot spare disk drive of another storage controller; (ii) receive a response to the request identifying a disk drive of a second storage controller as an alternative available hot spare disk drive; and (iii) communicate with the second storage controller to use the alternative available hot spare disk drive to rebuild the RAID.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
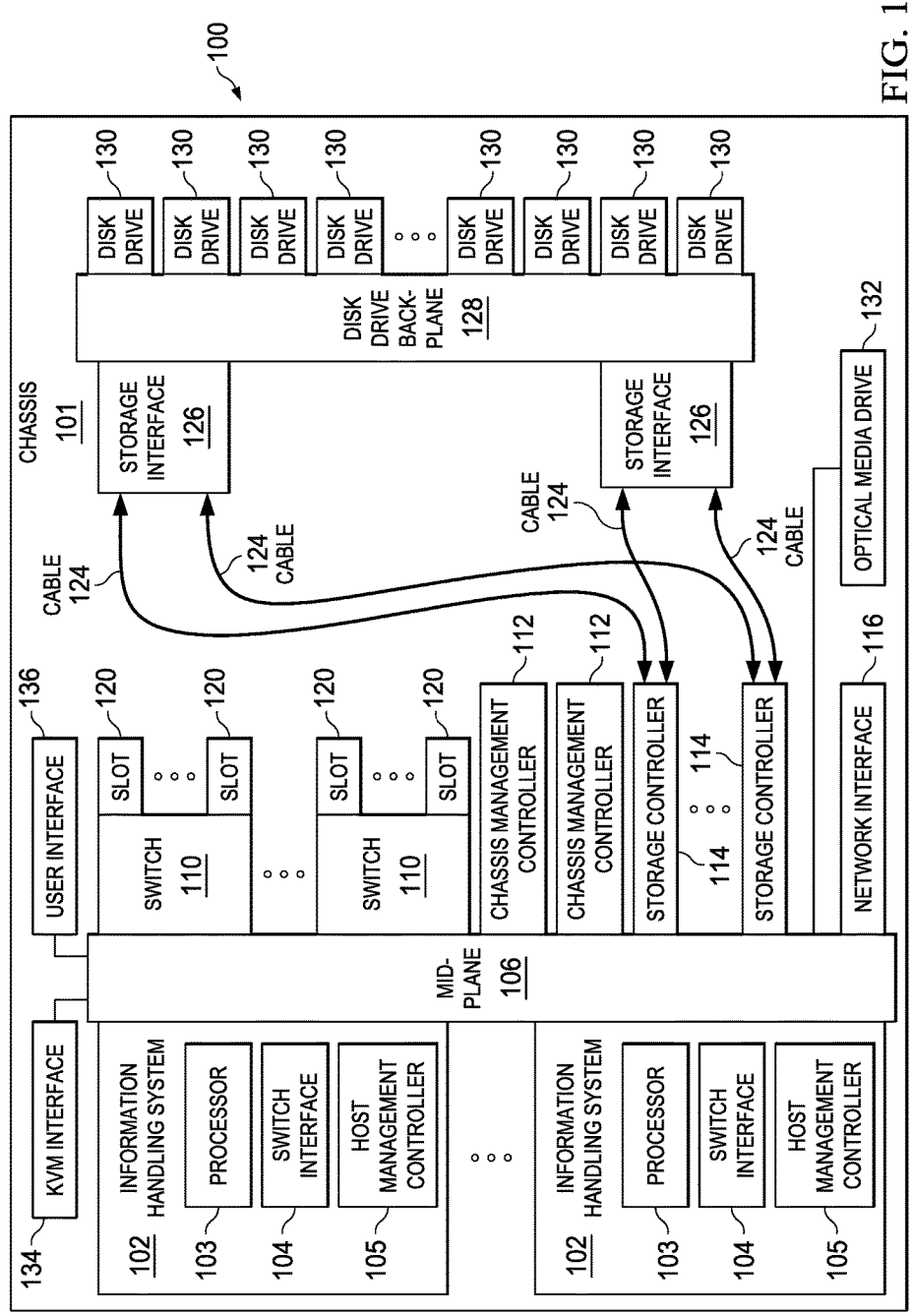
FIG. 1 illustrates a block diagram of an example system chassis with multiple information handling systems and with various peripheral and I/O capabilities common to the chassis as a whole, in accordance with embodiments of the present disclosure.
Figure 2:
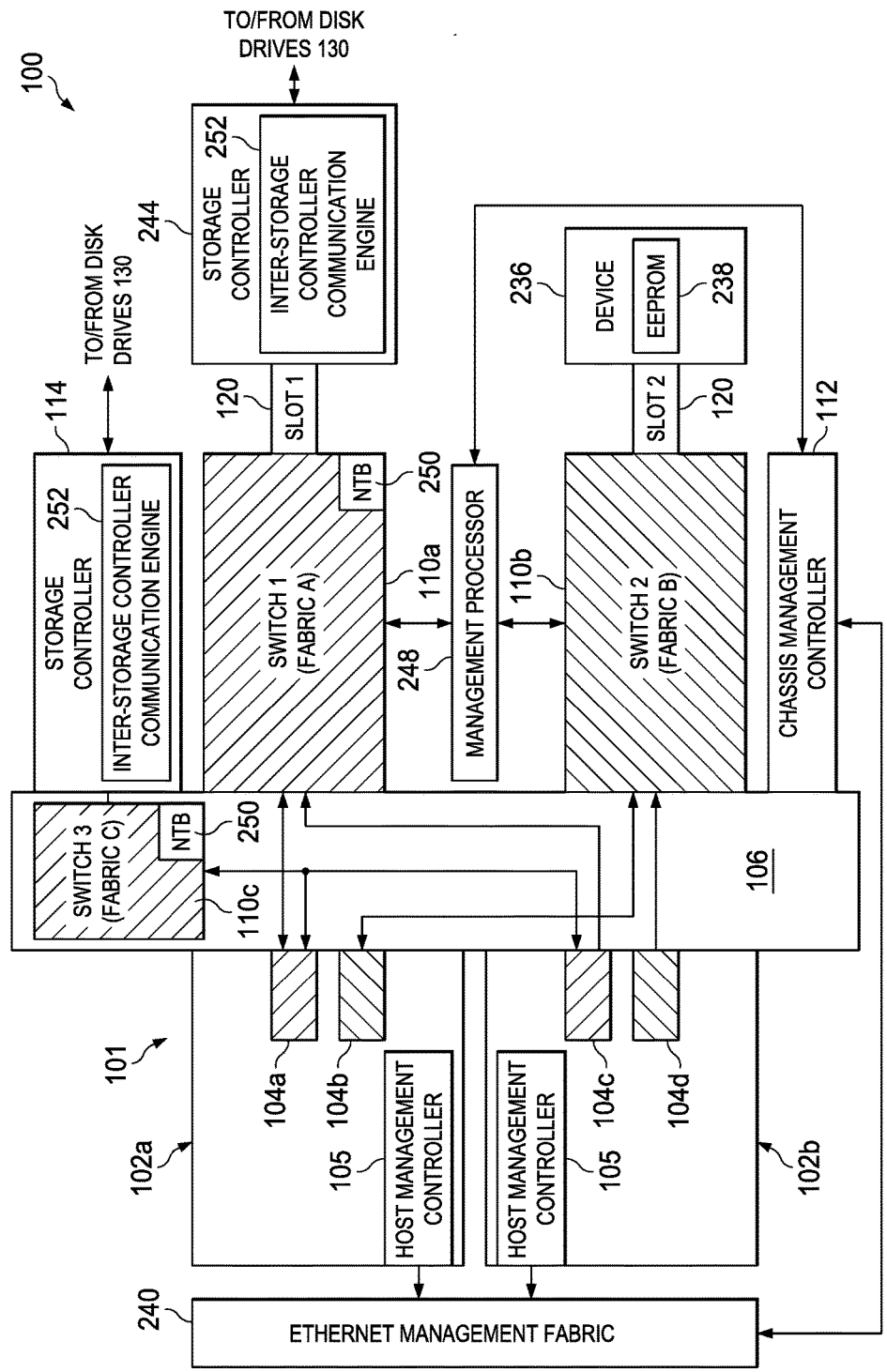
FIG. 2 illustrates a more detailed block diagram of an example system configured for switches and devices in a multi-root I/O virtualization environment for multiple information handling systems, in accordance with embodiments of the present disclosure.
Figure 3:
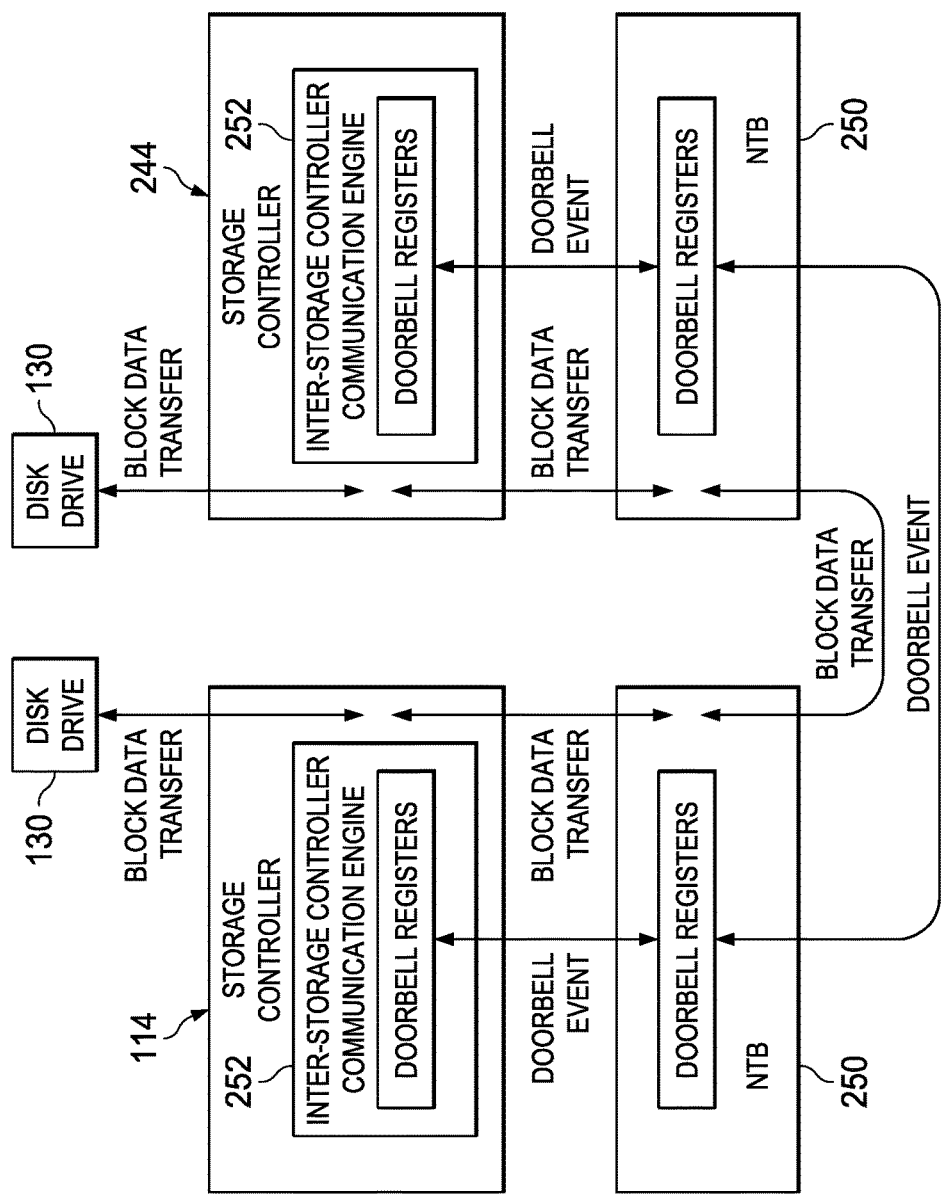
FIG. 3 illustrates a functional block diagram depicting communication between storage controllers, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system 102 may comprise a blade server having modular physical design. In these and other embodiments, an information handling system 102 may comprise an M class server. As depicted in FIG. 1, an information handling system 102 may include a processor 103, one or more switch interfaces 104 communicatively coupled to processor 103, and a host management controller 105 communicatively coupled to processor 103.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

A host management controller 105 may be implemented by, for example, a microprocessor, microcontroller, DSP, ASIC, EEPROM, or any combination thereof. Host management controller 105 may be configured to communicate with one or more of chassis management controllers 112 via midplane 106 (e.g., via an Ethernet management fabric). Host management controller 105 may be configured to provide out-of-band management facilities for management of information handling system 102. Such management may be made by elements of chassis 101 even if information handling system 102 is powered off or powered to a standby state. Host management controller 105 may include a processor, memory, and network connection separate from the rest of information handling system 102. In certain embodiments, host management controller 105 may include or may be an integral part of a baseboard management controller (BMC), Dell Remote Access Controller (DRAC) or an Integrated Dell Remote Access Controller (iDRAC).

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component information handling resources. A chassis management controller 112 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller 112 may define configurations of the storage subsystem (e.g., storage controllers 114, storage interfaces 126, disk drives 130, etc.) of system 100. For example, a chassis management controller 112 may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Web Services Management ("WS-MAN") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). Although FIG. 1 depicts chassis 101 as having two chassis management controllers 112, chassis 101 may include any suitable number of chassis management controllers 112.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low profile to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or another suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface 126 may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk drive backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives 130 may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling resources (e.g., PCIe adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at a time. Chassis management controller 112 may be configured to handle routing and switching through switches 110 to affect sharing of a resource to multiple information handling systems 102 or to affect dedicated assignment of a resource to a single information handling system 102.

FIG. 2 illustrates a more detailed block diagram of example system 100 configured for switches and devices in a multi-root I/O virtualization ("IOV") environment for multiple information handling systems 102, in accordance with embodiments of the present disclosure.

As shown in FIG. 2, chassis 101 may include a management processor 248 communicatively coupled to one or more of chassis management controller 112 and switches 110. Management processor 248 may be any system, device, or apparatus configured to facilitate management and/or control of switches 110. For example, management processor 248 may interface with a switch 110 via a sideband interface physically independent of the communications path between switch interfaces 104 and switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may run a Linux operating system and include application-programming-interfaces ("APIs") for supporting configuration of IOV in system 100 for sharing devices connected to slots 120 of chassis 101 to multiple information handling systems 102. The APIs of management processor 248 may provide the interface to chassis management controller 112 for configuring IOV. Management processor 248 may be configured to manage both switches 110. In one embodiment, management processor 248 may be communicatively coupled to an Ethernet management fabric 240 and to information handling systems 102. In another embodiment, chassis management controller 112 may be communicatively coupled to the information handling systems 102 through Ethernet management fabric 240. Management processor 248 may be directly communicatively coupled to the Ethernet management fabric 240 or through, for example, chassis management controller 112.

Although FIG. 2 depicts management processor 248 operable to facilitate management and/or control of switches 110, in some embodiments of the present disclosure, one or more chassis management controllers 112 may be configured to perform the functionality of management processor 248, in which a management processor 248 independent of the chassis management controllers 112 may not be present. In other embodiments of the present disclosure, such as when one or more host management controllers 105 may be configured to perform the functionality of management processor 248, a management processor 248 independent of the host management controllers 105 may not be present.

Chassis 101 may include multiple information handling systems 102. Chassis 101 may include any suitable number of information handling systems 102. In some embodiments, information handling systems 102 may be referred to as "blades". Each information handling system 102 may include switch interfaces 104, and a host management controller 105, as described in association with FIG. 1.

Switches 110 may contain PCIe cards instead of the typical blade Ethernet, Fibre Channel or InfiniBand cards. Switch interfaces 104 of the information handling systems 102 may couple to switches 110 through the switch interfaces 104 of switches 110. Switches 110 may couple information handling systems 102 to slots 120.

In one embodiment, each of information handling systems 102 may be communicatively coupled to each of switches 110 through one of switch interfaces 104 resident on the information handling system 102. For example, information handling system 102a may be communicatively coupled to switch 110a through switch interface 104a and to switch 110b through switch interface 104b. Information handling system 102b may be communicatively coupled to switch 110a through switch interface 104c and to switch 110b through switch interface 104d. Thus, each of switches 110 may provide its switching fabric to each of information handling systems 102 in order to route the given information handling system 102 to respective slots 120 associated with the switch 110.

Slots 120 may be configured to couple to associated devices, including a device 236 and an external storage controller 244, though fewer devices may be present than the associated capacity of chassis 101. Chassis 101 may include any suitable number of slots 120. In some embodiments, devices 236 may include PCIe-based cards or devices. Each such device 236 may represent an information handling resource to be selectively shared among multiple information handling systems 102 or dedicated to a single information handling system 102. A device 236 may comprise, for example, a RAID controller, network card, or other information handling resource. Furthermore, a device 236 may include a specific shared component, such as a NIC. Devices 236 may include management information or circuitry configured to provide information to chassis 101 regarding the operation or specification of device 236. For example, a device 236 may include EEPROM 238 comprising such information.

Storage controller 244 may include any system, apparatus, or device operable to manage the communication of data between one or more of information handling systems 102 and one or more of disk drives 130. In certain embodiments, a storage controller 244 may provide functionality including, without limitation, disk aggregation and redundancy (e.g., RAID), I/O routing, and error detection and recovery. Storage controller 244 may in some embodiments be shared among two or more information handling systems 102. In some embodiments, storage controller 244 may include a PCIe-based card or device. Storage controller 244 may represent an information handling resource to be selectively shared among multiple information handling systems 102 or dedicated to a single information handling system 102.

In order to support IOV, the driver and firmware of device 236 and.or storage controller 244 may include support for single root IOV (SR-IOV). To maintain routes between given information handling systems 102 and slots 120, switches 110 may include virtual hierarchies from slots 120 to information handling systems 102. Particular functions, such as virtual functions or shared functions, for SR-IOV for a given device 236 and/or storage controller 244 may be mapped in switch 110, providing behavior similar to multiple-root IOV (MR-IOV). Thus, in such case, a switch 110 may be considered a Multi-Root Aware (MRA) switch which bridges MR-IOV to SR-IOV so that SR-IOV virtual functions may be exposed to a node as physical functions, such that an information handling system 102 is not aware that a given device 236 and/or storage controller 244 is shared. In one embodiment, wherein device 236 contains multiple information handling resources such as a NIC and USB interface, a function may be provided for each such information handling resource. Thus, from the perspective of information handling systems 102, such multiple information handling resources may appear to be separate and unrelated. A given slot 120 or device 236 and/or storage controller 244 which has been virtualized may be accessed by two or more virtual functions, which allows the sharing of the resource. Physical functions, as opposed to the above-described virtual functions or shared functions, may be mapped or stored in management processor 248. A physical function representing an information handling resource may be provided to a single information handling system 102. In cases where a device 236 contains multiple information handling resources, individual physical functions may be provided for each such resource. Multiple instances of a virtual function may be provided to multiple information handling systems 102. If, for example, multiple information handling systems 102 are sharing a device 236, then access to device 236 may be divided into multiple virtual NICs using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

Because information handling resources, such as those in devices 236 and storage controller 244 coupled to slots 120, are not located within an information handling system 102, but rather in a shared chassis using switches 110 to virtualize and route I/O communications among selected information handling systems 102, allocation of such information handling resources may not be directly controlled by an associated information handling system 102. Consequently, allocation of information handling resources such as devices 236 and/or storage controller 244 with information handling systems 102 in chassis 101 may be conducted by chassis management controller 112. As described in greater detail below, chassis management controller 112 may be configured to allocate or otherwise direct other components of chassis 101 to allocate devices 236 and/or storage controller 244 to information handling systems 102. It is noted that while the functionality described herein contemplates virtualization for shared devices 236 and/or storage controller 244, the functionality described herein may also be extended to nonshared devices as well.

As shown in FIG. 2, system chassis 101 may include internal switching fabrics (e.g., Fabric A and Fabric B). In the embodiments represented by FIG. 2, Fabric A is associated with switch 110*a* (labeled "Switch 1") and Fabric B is associated with switch 110*b* (labeled "Switch 2"). Also, storage controllers 114 may each be associated with a particular switching fabric 110*c* (e.g., Fabric C) of chassis 101 (e.g., based upon a slot or connectors via which a particular storage controller 114 is coupled to mid-plane 106).

As shown in FIG. 2, to facilitate communication between storage controllers (e.g., storage controller 114 and storage controller 244), one or more switches 110 may include a non-transparent bridge (NTB) 250. An NTB 250 may comprise a PCIe-enabled point-to-point PCIe bus coupling two systems which are electrically isolated. The two systems on opposite sides of the bridge may have their own independent address domains. Accordingly, a host on one side of an NTB 250 may not have the visibility of the complete memory or I/O space on the other side of the bridge. To communicate across an NTB 250, each NTB endpoint may have one or more apertures exposed to a "local" system. Writes to these apertures may be mirrored to memory on the remote system. Communications can also occur through the use of doorbell registers that initiate interrupts to the alternate domain, and scratch-pad registers accessible from both sides.

Furthermore, to also facilitate communication between storage controllers (e.g., storage controller 114 and storage controller 244), each storage controller may include an inter-storage controller communication engine 252. An inter-storage controller communication engine 252 may comprise an engine within a storage controller configured to forward data to another storage controller based on a device path provided by a management controller (e.g., host management controller 105 and/or chassis management controller 112) and is capable of executing a protocol to allow for communication between storage controllers to control and manage hot spares associated with other storage controllers, as described herein. Inter-storage controller communication engine 252 may execute an agent-less protocol which allows for such inter-storage controller communication without invention of a host processor 103, thus avoiding the necessity of a processor executing cycles for monitoring and configuration of remote storage controllers. To implement its functionality, an inter-storage controller communication engine 252 may including a parser for parsing a device path provided by a management controller, functional components for updating status registers (e.g., doorbell registers) to notify a management controller of a storage controller's hot-spare requirements, and functional components for reporting error messages related to remote hot spare disk drives (e.g., I/O write failure, disk predictive failure, etc.).

During normal operation, a storage controller (e.g., storage controller 114 and/or storage controller 244) may control and manage a RAID comprising disk drives which it controls. In a typical configuration, a RAID may include active disk drives making up the RAID and one or more spare disk drives (also known as "hot spares"). In such a configuration, the disk drives configured as hot spares generally may remain idle until a RAID suffers a failure of one of its active disk drives, at which time the RAID may rebuild itself using a hot spare.

Traditionally, a storage controller is limited to accessing a hot spare under direct control of the storage controller. However, in accordance with methods and systems of the present disclosure, a storage controller may be configured to communicate with another storage controller to allow the storage controller to access a hot spare disk drive under control of the other storage controller to use as its own hot spare for a RAID under its own control.

In operation, storage controllers (e.g., storage controllers 114 and/or storage controllers 244) of chassis 101 may be communicatively coupled together, for example via NTBs 250 interfacing inter-storage controller communications engines 252. In addition, a master host management controller 105 and chassis management controller 112 may monitor and control assigning a hot spare under the control of a storage controller to another storage controller. Such master host management controller 105 and chassis management controller 112 may be coupled to storage controllers via any appropriate sideband (e.g., Inter-Integrated Circuit bus, PCIe Vendor Defined Message bus, etc.) or other communication channel. For example, the master host management controller 105 may be coupled to and monitor any storage controllers (not shown) within a host information handling system 102 while chassis management controller 112 may be coupled to and monitor storage controllers 114 and 244 of chassis 101). Such monitoring may include monitoring of hot spare disk drives of each storage controller which are available to share with other storage controllers. In the event of a failure of a disk drive within a RAID controlled by a storage controller such that the RAID enters a degraded state, and the storage controller is not in control of an available hot spare drive, the storage controller may request a hot spare drive of another storage controller from a host management controller 105 and/or chassis management controller 112, and then after host management controller 105 and/or chassis management controller 112 assigns such a hot spare drive of another storage controller, the storage controller may rebuild the degraded RAID using the hot spare drive of the other storage controller and may issue I/O between inter-storage controller communications engines 252 via a non-transparent bridge (e.g., NTB 250) between root complexes.

FIG. 3 illustrates a functional block diagram depicting communication between storage controllers, in accordance with embodiments of the present disclosure. Once two storage controllers (e.g., storage controller 114, storage controller 244) are configured for communication with one another, a host information handling system 105 may push data in a usual manner to its associated local storage controller in order to write to a disk managed by another remote storage controller, and the local storage controller may divert the data to NTB segments rather than to the local storage controller's own buffer. The local storage controller may generate a Direct Memory Access segment address of NTB 250 rather than its own address and provide it to the host information handling system 105. Thus, the host information handling system 105 may use the Direct Memory Access address to push the data, such that NTB 250 segments buffers receive the data. Once the data is filled, the host information handling system 105 or its local storage controller may ring a doorbell for transfer. The target of the data may receive the data from NTB 250 and may start Direct Memory Access through the target remote storage controller.

In the absence of a host, an inter-storage controller communication engine 252 may generate the doorbell and push the read data from disk to NTB segments, and the inter-storage controller communication engine 252 of a target storage controller will consume once the doorbell is ringed by the source storage controller.

Figure 4:
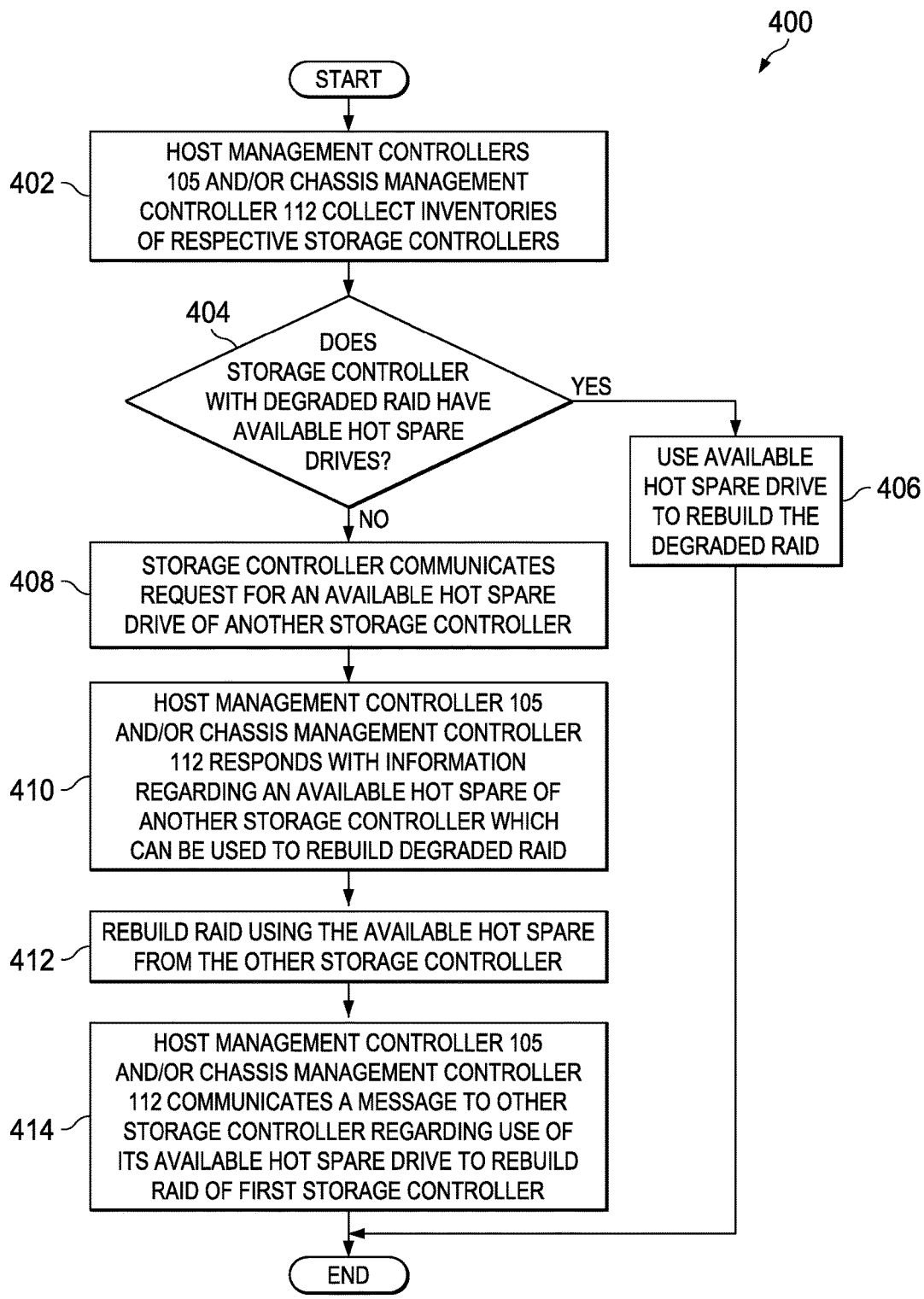
FIG. 4 illustrates a flow chart of an example method for accessing a hot spare drive using a non-transparent bridge, in accordance with embodiments of the present disclosure.

FIG. 4 illustrates a flow chart of an example method 400 for accessing a hot spare drive using a non-transparent bridge, in accordance with embodiments of the present disclosure. According to certain embodiments, method 400 may begin at step 402. As noted above, teachings of the present disclosure may be implemented in a variety of configurations of system 100 as shown in FIGS. 1 and 2. As such, the preferred initialization point for method 400 and the order of the steps comprising method 400 may depend on the implementation chosen. In these and other embodiments, method 400 may be implemented as firmware, software, applications, functions, libraries, or other instructions.

At step 402, host management controllers 105 and/or chassis management controller 112 may collect inventories of respective storage controllers, including the disk drives controlled by each and the available hot spare disk drives of each. Such inventory information may be shared among host management controllers 105 and chassis management controller 112, such that a master host management controller 105 and/or chassis management controller 112 maintains a database storing information regarding storage controllers and their respective hot spare disk drives. To collect such data, host management controllers 105 and/or chassis management controller 112 may communicate messages (e.g., via a sideband interface such as an Inter-Integrated Circuit bus or a PCIe Vendor Defined Message bus) to storage controllers which may respond with the requested information.

At step 404, in response to a RAID of a storage controller entering a degraded state, the storage controller may determine if it has any available hot spare drives "local" (e.g., under the direct control of) the storage controller. If the storage controller has an available hot spare drive local to it, method 400 may proceed to step 406. Otherwise, method 400 may proceed to step 408.

At step 406, in response to the storage controller having an available hot spare drive local to it, it may use the available hot spare drive to rebuild the degraded RAID. After completion of step 406, method 400 may end.

At step 408, in response to the storage controller not having an available hot spare drive local to it, the storage controller may communicate a request to a host management controller 105 and/or chassis management controller 112 for an available hot spare drive of another storage controller.

At step 410, a host management controller 105 and/or chassis management controller 112 may respond with information regarding an available hot spare drive of another storage controller which can be used to rebuild the degraded RAID.

At step 412, the storage controller may rebuild the RAID using the available hot spare drive from the other storage controller. I/O for rebuilding the RAID may be communicated over an NTB (e.g., NTB 250) as described elsewhere in this disclosure. At step 414, host management controller 105 and/or chassis management controller 112 may communicate a message to the other storage controller regarding use of its available hot spare drive to rebuild the RAID of the first storage controller. After completion of step 414, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using system 100, components thereof or any other system such as those shown in FIGS. 1 and 2 operable to implement method 400. In certain embodiments, method 400 may be implemented partially or fully in software and/or firmware embodied in computer-readable media.

Although the foregoing contemplates the specific use case of managing hot spare drives across storage controller domains, the systems and methods described above may provide benefits relating to other use cases. For example, the inter-storage controller communication engine described above may allow for one host information handling system to intelligently access data of a second host information handling system if a host operating system of the second host information handling system is failed or has crashed. The systems and methods described above may also provide an ability to power on a PCI bridge storage controller port of a host information handling system which is powered off, thus avoiding data loss when an initiator sends data to a target storage controller when its associated host information handling system is down. The systems and methods described above may further provide for allowing load balancing of one storage controller to be taken over by another storage controller.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
a first storage controller for managing a Redundant Array of Independent Disks (RAID) comprising a plurality of disk drives; and
a second storage controller for managing at least one disk drive other than the plurality of disk drives;
wherein the first storage controller is configured to:
in response to the RAID having a degraded state and the first storage controller not having an available hot spare disk drive local to the first storage controller, communicate a request for a hot spare disk drive of another storage controller;
receive a response to the request identifying a disk drive of the second storage controller as an alternative available hot spare disk drive; and
communicate with the second storage controller to use the alternative available hot spare disk drive to rebuild the RAID, wherein the first storage controller does not include a direct connection to the alternative available hot spare disk drive, and wherein the first storage controller includes an inter-storage controller communication engine configured to facilitate communication between the first storage controller and the alternative available hot spare disk drive via the second storage controller without interaction of a host information handling system;
wherein the system further comprises a management controller different from the first storage controller and the second storage controller, the management controller being communicatively coupled to the first storage controller and configured to receive the request and issue the response responsive to the request.

2. The system of claim 1, wherein the first storage controller is further configured to communicate with the second storage controller via a non-transparent bridge.

3. The system of claim 1, wherein the management controller is configured to, in concert with one or more other management controllers, maintain a database of information regarding storage controllers and available hot spare disk drives of the storage controllers.

4. The system of claim 1, wherein the management controller comprises one of a chassis management controller and a host management controller.

5. A method comprising:
in response to a Redundant Array of Independent Disks (RAID) managed by a first storage controller having a degraded state and the first storage controller not having an available hot spare disk drive local to the first storage controller, communicating a request for a hot spare disk drive of another storage controller;
receiving a response to the request identifying a disk drive of a second storage controller as an alternative available hot spare disk drive; and
communicating with the second storage controller to use the alternative available hot spare disk drive to rebuild the RAID, wherein the first storage controller does not include a direct connection to the alternative available hot spare disk drive, and wherein the first storage controller communicates with the alternative available hot spare disk drive via an inter-storage controller communication engine coupled to the second storage controller without interaction of a host information handling system;
wherein the request is communicated to a management controller different from the first storage controller and the second storage controller.

6. The method of claim 5, wherein communicating with the second storage controller comprises communicating with the second storage controller via a non-transparent bridge.

7. The method of claim 5, wherein receiving the response comprises receiving the response from the management controller.

8. The method of claim 5, wherein the management controller is configured to, in concert with one or more other management controllers, maintain a database of information regarding storage controllers and available hot spare disk drives of the storage controllers.

9. The method of claim 5, wherein the management controller comprises one of a chassis management controller and a host management controller.

10. An article of manufacture comprising:
a non-transitory computer readable medium; and
computer-executable instructions carried on the computer readable medium, the instructions readable by a processor, the instructions, when read and executed, for causing the processor to:
in response to a Redundant Array of Independent Disks (RAID) managed by a first storage controller having a degraded state and the first storage controller not having an available hot spare disk drive local to the first storage controller, communicate a request for a hot spare disk drive of another storage controller;
receive a response to the request identifying a disk drive of a second storage controller as an alternative available hot spare disk drive; and
communicate with the second storage controller to use the alternative available hot spare disk drive to rebuild the RAID, wherein the first storage controller does not include a direct connection to the alternative available hot spare disk drive, and wherein the first storage controller includes an inter-storage controller communication engine configured to facilitate communication between the first storage controller and the alternative available hot spare disk drive via the second storage controller without interaction of a host information handling system;
wherein the request is communicated to a management controller different from the first storage controller and the second storage controller.

11. The article of claim 10, wherein communicating with the second storage controller comprises communicating with the second storage controller via a non-transparent bridge.

12. The article of claim 10, wherein receiving the response comprises receiving the response from the management controller.

13. The article of claim 10, wherein the management controller is configured to, in concert with one or more other management controllers, maintain a database of information regarding storage controllers and available hot spare disk drives of the storage controllers.

14. The article of claim 10, wherein the management controller comprises one of a chassis management controller and a host management controller.

* * * * *